United States Patent
Himmelsbach (10) Patent No.: US 7,621,801 B2
(45) Date of Patent: Nov. 24, 2009

(54) CLAMPING DEVICE COMPRISING A CENTERING DEVICE ON A GRINDING SPINDLE ROTOR, AND ROTARY PART COMPRISING ONE SUCH CENTERING DEVICE

(75) Inventor: Georg Himmelsbach, Haslach (DE)

(73) Assignee: Erwin Junker Maschinenfabrik GmbH, Nordrach (DE)

( * ) Notice: Subject to any disclaimer, the term of this patent is extended or adjusted under 35 U.S.C. 154(b) by 0 days.

(21) Appl. No.: 11/793,695

(22) PCT Filed: Dec. 7, 2005

(86) PCT No.: PCT/EP2005/013124

§ 371 (c)(1),
(2), (4) Date: Aug. 13, 2007

(87) PCT Pub. No.: WO2006/072324

PCT Pub. Date: Jul. 13, 2006

(65) Prior Publication Data

US 2008/0194186 A1   Aug. 14, 2008

(30) Foreign Application Priority Data

Dec. 22, 2004   (DE) .................. 10 2004 061 871

(51) Int. Cl.
*B24B 41/00* (2006.01)
(52) U.S. Cl. .................. 451/342; 451/358; 451/360
(58) Field of Classification Search .................. 451/342, 451/358, 360, 541, 911
See application file for complete search history.

(56) References Cited

U.S. PATENT DOCUMENTS

| | | | | |
|---|---|---|---|---|
| 4,352,773 A * | 10/1982 | Jenkins | ....................... | 264/262 |
| 4,577,440 A * | 3/1986 | Junker | ....................... | 451/342 |
| 4,729,193 A * | 3/1988 | Gant et al. | ................... | 451/342 |
| 4,731,955 A * | 3/1988 | Henle | ........................ | 451/342 |
| 5,319,886 A * | 6/1994 | Steere, Jr. | .................... | 451/342 |
| 5,658,192 A * | 8/1997 | Reinauer | ..................... | 451/342 |
| 7,357,702 B2 * | 4/2008 | Ficai | .......................... | 451/508 |

FOREIGN PATENT DOCUMENTS

| | | |
|---|---|---|
| DE | 3322258 | 6/1984 |
| DE | 3405556 | 9/1985 |
| DE | 19615527 | 11/1997 |

* cited by examiner

*Primary Examiner*—Eileen P. Morgan
(74) *Attorney, Agent, or Firm*—Jordan and Hamburg LLP (57) ABSTRACT

A grinding disk base body is fixable to the centering section of a grinding spindle rotor in a centering manner by the base body which includes an inner recess from which two fixed projections project inwardly. The base body also includes a mobile supporting element in the form of a cam disk that is supported on two bearing rods in a recess of the base body. The cam disk has an engagement opening for a torsional tool. When the cam disk is twisted, it can be supported or brought back against the centering section. The cam disk is retracted when the base body is displaced towards the centering section, and is supported against the centering section for the final centering. The fixed projections and the cam disk are preferably arranged in such a way that the action line of the cam disk is in the median line of the fixed projections.

22 Claims, 6 Drawing Sheets

CLAMPING DEVICE COMPRISING A CENTERING DEVICE ON A GRINDING SPINDLE ROTOR, AND ROTARY PART COMPRISING ONE SUCH CENTERING DEVICE

BACKGROUND OF THE INVENTION

The invention relates to a clamping device on a grinding spindle rotor and to a rotary part with a centering device.

Such a clamping device is known from DE 33 22 258 C1. The area of application for such clamping devices and grinding spindle rotors are primarily circular and non-circular grinding machines, for example, universal grinding machines with which high-quality machine parts are ground. This demands the highest dimensional accuracy and flawless surface quality. The grinding machines in serial production for grinding shaft parts as well as camshafts and crankshafts are an especially important example. However, other grinding machines can be used if high demands are placed on the grinding result.

In the case of DE 33 22 258 C1, the rotary part to be clamped on the grinding spindle rotor is a grinding wheel that comprises a base body and an abrasive layer applied circumferentially thereto. The base body of the grinding wheel has an interior recess from which three grooves run radially outward. These three grooves are situated at a regular 120-degree angular interval from one another. With this interior recess, the rotary part is placed onto a centering section of the grinding spindle rotor, and there, is clamped securely in the axial direction between a positioning flange of the grinding spindle rotor and a clamping flange. The centering section has a largely cylindrical basic shape, however, including three uniformly spaced splines projecting radially outward from the exterior circumference of the centering section. The exterior diameter of the splines is the same as the interior diameter of the interior recess in the rotary part outside of the axis-parallel grooves. The splines thus form three positioning bodies with which the centering section is centered on the interior recess of the rotary part.

This known clamping device is intended to facilitate placement of the rotary part onto the centering section while simultaneously attaining precise centering. Specifically, the grooves of the rotary part are aligned on the splines of the centering section for placing the rotary part thereon. The splines have a larger radial distance from the groove base of the grooves embodied in the interior recess of the rotary part. Since the splines also have a smaller circumferential extension than the grooves, consequently there is no simple way to place the rotary part onto the centering section with an exact angular alignment. As soon as a planar side of the rotary body is positioned against the positioning flange of the grinding spindle rotor, the rotary body is turned so that the splines now are positioned to fit on the cylindrical interior recess of the rotary part, which recess has a smaller diameter than the groove base of the three grooves. The rotary body is thus securely centered on the centering section.

The clamping device in accordance with DE 33 22 258 C1 fulfills its purpose and has proved itself in practice. However, when placing the rotary body on the centering section, attention must be paid to the exact angular alignment of both parts. In addition, the suitable fit between the three splines that form the support body and the interior diameter of the interior recess still requires a compromise. While there should be precise centering so that there is the closest possible fit, attachment, which also includes the final rotation, should also be as easy as possible. Thus, there is a need for facilitated operability of the known clamping device with even more precise centering.

DE 34 05 556 C1 describes a clamping device for a grinding ring that has a detachably mounted clamping flange on a carrying flange. The bearing pin on which the grinding ring is placed and is to be clamped has a plurality of splines running across a length thereof and projecting in the radial direction. Embodied in the interior bore of the grinding ring are correspondingly formed grooves that are allocated to each of the splines. The cross-sectional profile of the projecting splines has the contour of a circular arc with a radius having a center of curvature which is offset by an eccentricity from the center point of the bearing pin. Thus, although precise centering with tight clearance is possible due to relatively broad radial tolerances, in terms of production engineering the production of a circular spline on the contour, the center of curvature of which is arranged eccentrically, is complex and demanding, especially since corresponding recesses that fit the splines must be provided in the interior bore of the grinding ring.

The underlying object of the invention is therefore to improve the known clamping device in such a manner that joining the grinding wheel rotor and rotary part is as simple as possible and is done with a low expenditure of force, while at the same time centering occurs in a manner that is absolutely certain and highly precise. Moreover, production should be as cost-effective as possible, in particular for wide grinding wheels or wide grinding wheel sets with long centering sections required therefor.

SUMMARY OF THE INVENTION

For attaining this object, a clamping device includes a rotary part including an interior recess and three support bodies that are disposed at an angular interval from one another in the interior recess. The rotary part is receivable on a grinding spindle rotor which includes a centering section that continuously centeringly receives the rotary part while passing through the interior recess thereof with mutually centering contact between the interior recess of the rotary part and the centering section of the grinding spindle rotor via the three support bodies. Two of the three support bodies comprises fixed projections of said rotary part that project into the interior recess of the rotary part, and a third support body of the three support bodies includes an adjusting member that is movably carried in the rotary part for movement thereof between a radially outward position and a radially inward centering position adjacent to said centering section. A detachable device allows securement by axially clamping the rotary part on the grinding spindle rotor.

In the clamping device according to the invention, the prerequisite for high precision when centering is created by the two support bodies embodied as fixed projections that project into the interior recess of the rotary part. These fixed projections are preferably produced using coordinate grinding, the rotary body after its assembly on a grinding spindle rotor having a concentricity of preferably ≦2 μm. In contrast, the third support body is movably carried in the rotary part and forms an adjusting member that can be moved between two positions. For placing the rotary part onto the centering section, the adjusting member is moved or drawn outward in the radial direction into the rotary part. The interior recess of the rotary part then forms a free cross-section in this area, providing a good deal of radial clearance between the interior recess and the centering section. The rotary part can thus be placed onto the centering section easily and at any desired angle. As soon as the rotary part has attained its final axial position, it can be securely and centeringly clamped in this position, and also at any desired angle. This occurs in that the movably carried adjusting member is moved to its second position in which it is moved radially inward out of the rotary part and is adjacent to the centering section. The adjusting member is preferably self-locking, in particular embodied as a self-locking cam disk with a cam with a slight pitch. However, it is possible for the adjusting member to be embodied such that it can be fixed, i.e., it is fixed in this position after it is positioned at the centering section.

Since the accuracy is provided by the two support bodies embodied as fixed projections, it is now only necessary to attain secure and symmetrical positioning of the rotary part against the cylindrical centering section with the movably carried adjusting member. The advantages of the three-point support in accordance with the aforesaid prior art are then maintained. They are comprised in particular in the statically determined, but not, over-determined support by three support bodies. The line of action of the movably carried adjusting member should be in the angle bisecting line to the two fixed projections. In the simplest case, a mutual angular distance of preferably 120 degrees is again selected for all support bodies. Depending on the application, however, other angular distances are possible, but the line of action for the adjusting member is preferably located in the angle bisecting line. Compared to the prior art, handling is substantially easier, however, because for joining and taking apart it is no longer necessary to attend to precise angular position and precisely fitting rotation of the rotary part relative to the centering section. The amount of pressure between the support bodies and the centering section is determined solely by the setting of the movably carried adjusting member and does not affect the joining of the rotary part and centering section. In addition, production engineering advantages result because the centering section can be embodied with a continuous smooth cylindrical contour without projections or grooves. The cylindrical centering section can therefore be ground with nothing further to diameters with an accuracy in the $\mu$m range. The better manageability of the inventive clamping device is particularly noticeable when the rotary body and the centering section have a long axial extension, as is the case for roller-type grinding bodies or those grinding bodies that are constructed from a plurality of individual grinding wheels spaced apart from one another. The latter is used when grinding shaft parts and camshafts and crankshafts. The invention can be applied with particularly good effect with CBN and diamond grinding wheels.

Thus the movably carried adjusting member can be advantageously embodied in the form of a cam disk that is carried in the rotary part with an axis of rotation parallel to its axis of rotation and that has an engagement opening for inserting a torsional tool into the end face. Such a cam disk is a flat component that is economical to produce, that can be carried in a recess of the rotary part at a slight distance from the interior contour of this recess, and that is easy to turn for instance with a socket wrench (Allen tool) that is inserted into the engagement opening of the cam disk. Such a flat component that only has to have a slight distance to the surrounding recess means only a slight disturbance of the rotationally uniformly distributed mass in the rotary tool so that the possible effects on an interfering imbalance can easily be compensated. In order to reduce the mass imbalance to a minimum, grinding wheels and intermediate rings are balanced after their production.

A particularly simple embodiment with a cam disk as adjusting member can furthermore be attained in that the exterior contour of the cam disk is supported on two bearing pins that are disposed in the rotary part parallel to the axis of rotation thereof. Such bearing pins can be attached easily and also without greatly disturbing the mass ratios in the rotary part. In this embodiment, the cam disk rests on the bearing pins and does not need any structurally embodied axis of rotation.

Another advantageous embodiment of the adjusting member can be comprised in that it is a pin that is displaceably carried in a radially running bore of the rotary part and is pre-stressed inwardly into the interior recess by a compression spring. The selection of the compression spring sets the pressure with which the fixed projections and the adjusting member are positioned against the cylindrical centering section. The pin is moved into its inactive position in that it is engaged by a pivoting lever that is carried in the rotary part with a pivot axis that runs parallel to its axis of rotation and has an engagement opening for inserting a torsional tool into the end face. Thus, prior to joining the parts, a torsional tool such as, for example, an Allen tool or another socket wrench is inserted into the engagement opening of the pivoting lever and the pin is retracted outward by turning the pivoting lever. The rotary part can then easily be placed onto the centering section, whereupon the compression spring is released again and the pin is positioned pressing against the centering section. It is also possible for the adjusting member and its associated compression spring to act like a feeler. In such a case, the rotary part is placed onto the centering section of the grinding spindle rotor such that the two fixed projections are positioned above on the centering section of the grinding spindle rotor and remain in this position due to gravity, whereby the adjusting member is also positioned on the bottom of the centering section as a result of the spring force on the centering section so that there is centering of the rotary part on the centering section of the grinding spindle rotor.

A particular design is advantageous in terms of production engineering results for both of the aforesaid embodiments in that the required recesses for the cam disk or for the pivoting lever are covered to the outside by a cover that has an access opening for the torsional tool. The cover can be attached to the rotary part with fastening screws and thus can simultaneously act as fixing member, fixing the situation or position of the cam disk or of the pivoting lever.

The inventive clamping device can be provided on more than just grinding wheels as they are depicted in DE 33 22 258 C1. It can also be used for intermediate rings that are disposed between the individual grinding wheels of a cylindrical grinding body constructed from a plurality of grinding wheels. Since in this case the individual grinding wheels and intermediate rings must be pushed over the larger axial extension of the centering section when the grinding wheels and intermediate rings are added or removed, the advantages of the inventive grinding device have particular effect.

The two fixed projections of the rotary part are advantageously embodied integrally with the latter and have the shape of axially running elevations that have an arched cross-sectional shape. The arched shape is mainly important for the simple placement and turning of the rotary part, because it is not necessary to take into account any particular angular position. In addition, this results in a nearly linear contact between the fixed projections of the rotary part and the cylindrical centering section, in contrast to the flat placement in the prior art. The principle of three-point support is thus even more closely approximated.

In order to precisely define a contact point, in accordance with another advantageous embodiment it is provided that the adjusting member has a spherical contour in the direction of the axis of rotation of the rotary part.

In the exemplary embodiment having an adjusting member embodied as a cam disk, this cam disk is disposed in the base body of the rotary part with a certain undercut, i.e., the cam "dips" slightly deeper into the base body of the rotary part than does its radius.

In accordance with another aspect of the invention, an inventive rotary part, in particular a grinding wheel, has a centering device integrated therein. This centering device is integrated into the base body of the rotary part and has two fixed projections and a support body, in the form of an adjusting member, that is largely displaceable relative the fixed projections. The two fixed projections are preferably arranged integrally with the base body of the rotary part and projecting into its interior recess and provide preferably linear or point support on the centering section of the grinding spindle rotor, the third, displaceable support body being arranged opposite thereto and forming the third support on the centering section of the grinding spindle rotor in the sense of a tri-area bearing.

Advantageously, the rotary part is a grinding wheel that is preferably made in a composite manner. An interior ring is provided that has the fixed projections embodied in its interior recess and in which the third, displaceable support body is received for placing on the centering section of the grinding spindle rotor. The interior ring is preferably made of metal, while the rest of the base body of the grinding wheel can be constructed of plastic or for instance aluminum, an abrasive layer being provided on its exterior circumference. However, it is also possible for the interior ring made of metal with the centering device to carry a complete base body made of corundum on its exterior.

The invention is described in greater detail in the following using the exemplary embodiments depicted in the drawings:

DETAILED DESCRIPTION OF THE INVENTION

Figure 1:
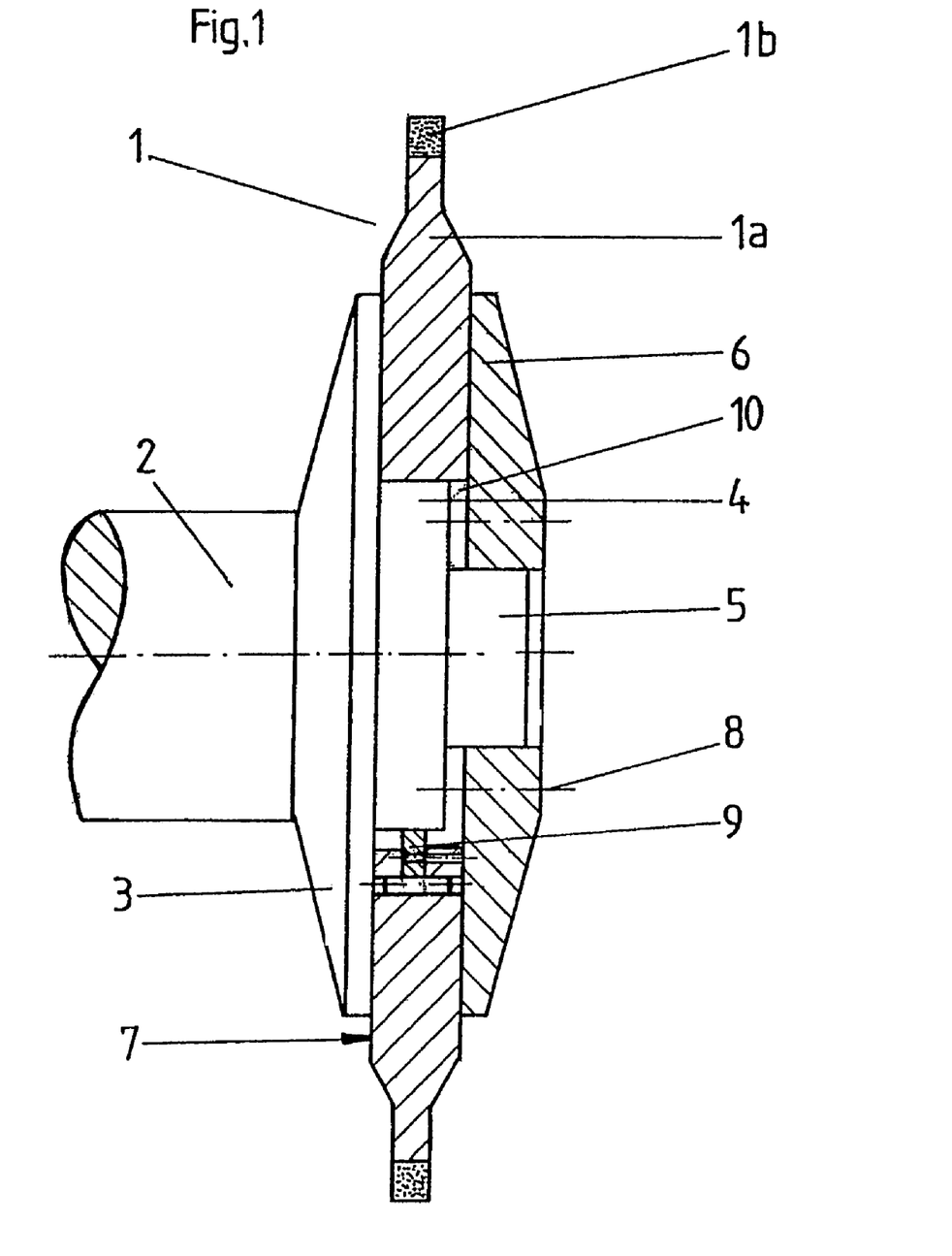
FIG. 1 depicts a longitudinal section through the inventive clamping device.

In the longitudinal section in accordance with FIG. 1, a rotary part is designated by the numeral 1 and is to be centeringly clamped on the grinding spindle rotor 2. The rotary part 1 in this case is a grinding wheel that comprises a base body 1a and an abrasive layer 1b circumferentially surrounding base body 1a. The grinding wheel can be embodied as a CBN or diamond grinding wheel. The type of bond is not essential, such that all usual bonds are possible, such as, for example, using ceramic, synthetic resin, or metal. Even galvanically covered CBN grinding wheels can be used. For the inventive clamping device, it is primarily the base body 1a of the grinding wheel that is significant, and that portion, in general, is metallic. Substances that are reinforced with synthetic or carbon fibers and that are widely used today are also, however, suitable for the inventive clamping device.

The grinding spindle rotor 2 forms a rotating drive shaft and has a positioning flange 3, a cylindrical centering section 4, and a centering collar 5. A mounting flange 6 is centeringly placed on the centering collar 5 and attached by means of tensioning bolts 8, indicated here merely with center lines thereof.

The base body 1a of the grinding wheel is securely clamped between the support flange 3 and the mounting flange 6 when the tensioning bolts 8 are tightened in the axial direction, a planar side 7 of the base body 1a assuming a press fit position against the positioning flange 3.

Figure 2:
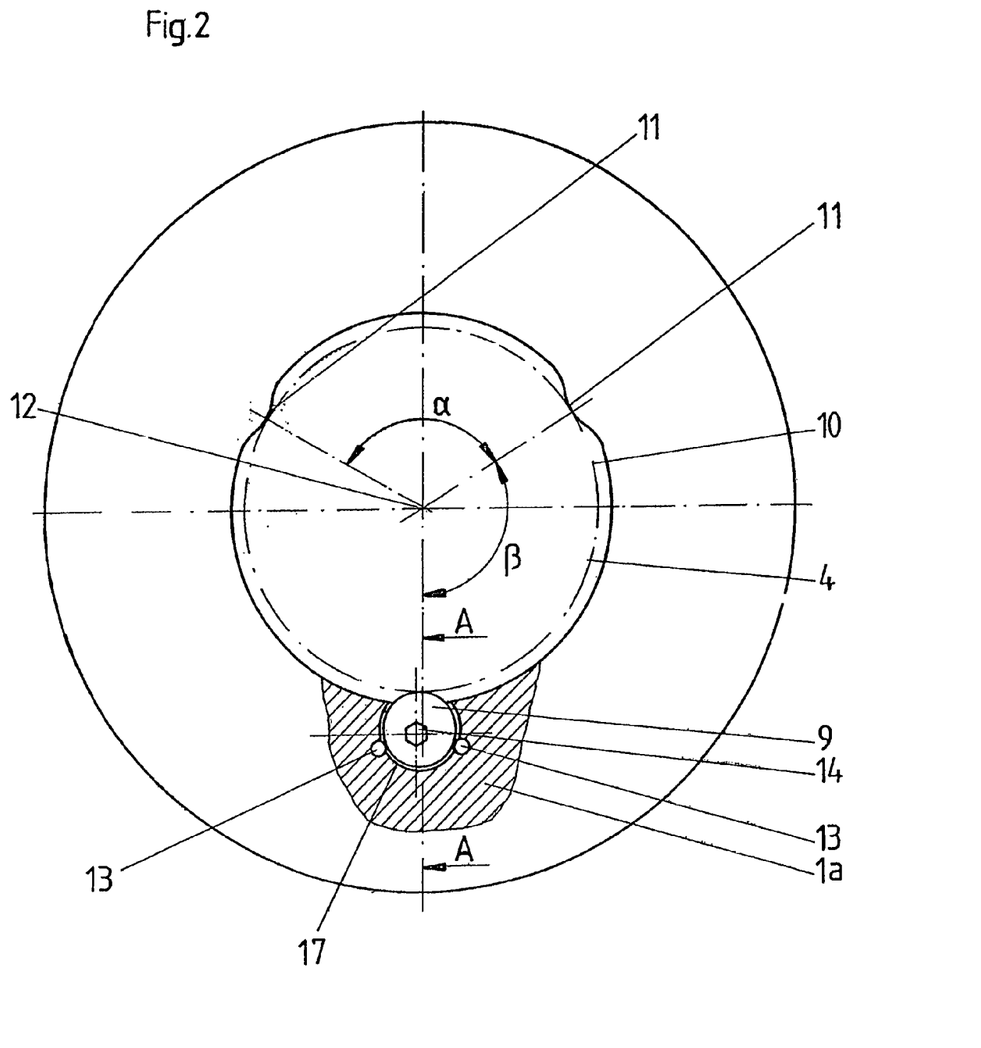
FIG. 2 depicts a first exemplary embodiment in which the movably carried adjusting member is embodied in the form of a cam disk.

FIG. 2 depicts a section of the base body 1a in a view perpendicular to the longitudinal section in accordance with FIG. 1. According to the depiction, the base body 1a has an interior recess 10 that is largely circular in shape. However, two fixed projections 11 as support bodies project inward into the interior recess. The fixed projections are embodied integrally with the base body 1a and have the shape of axially running, relatively flat elevations. These elevations are slightly arched, as can clearly be seen in FIG. 2.

The movably carried adjusting member, which is embodied as a cam disk 9 in FIG. 2, acts as the third support body. The cam disk 9 is disposed with a certain undercut in a pocket-shaped recess 17 of the base body 1a, and is supported on two bearing pins 13 that are arranged running parallel to the axis of rotation 12 of the base body 1a and running therein. The cam disk 9 has an engagement opening 14 into which a torsional tool 15 can be inserted. Details can be found in the depiction in accordance with FIG. 3, which is enlarged even more.

The cam disk 9 can embody a control curve such that when it turns areas of the cam disk 9 protrude inward into the interior recess 10.

In FIG. 2, the broken circular line in the interior of the interior recess 10 indicates the exterior circumference of the cylindrical centering section 4. It is clear that when the cam disk 9 is turned, the base body 1a finally centers automatically on the centering section 4. The line of action of the cam disk 9 should be approximately in the angle bisecting line to the two fixed projections 11. However, corresponding to the prior art, a completely uniform arrangement can be selected so that the support bodies are each separated from one another by an angular distance of approximately 120 degrees, that is, angles α and β are identical in accordance with FIG. 2. It must still be determined that in the depiction in accordance with FIG. 2, the cam disk 9 does not have any fixed structural axis of rotation. The rotary movement occurring during sliding on the bearing pins 13 can even have a geometrical axis that moves continuously.

Figure 3:
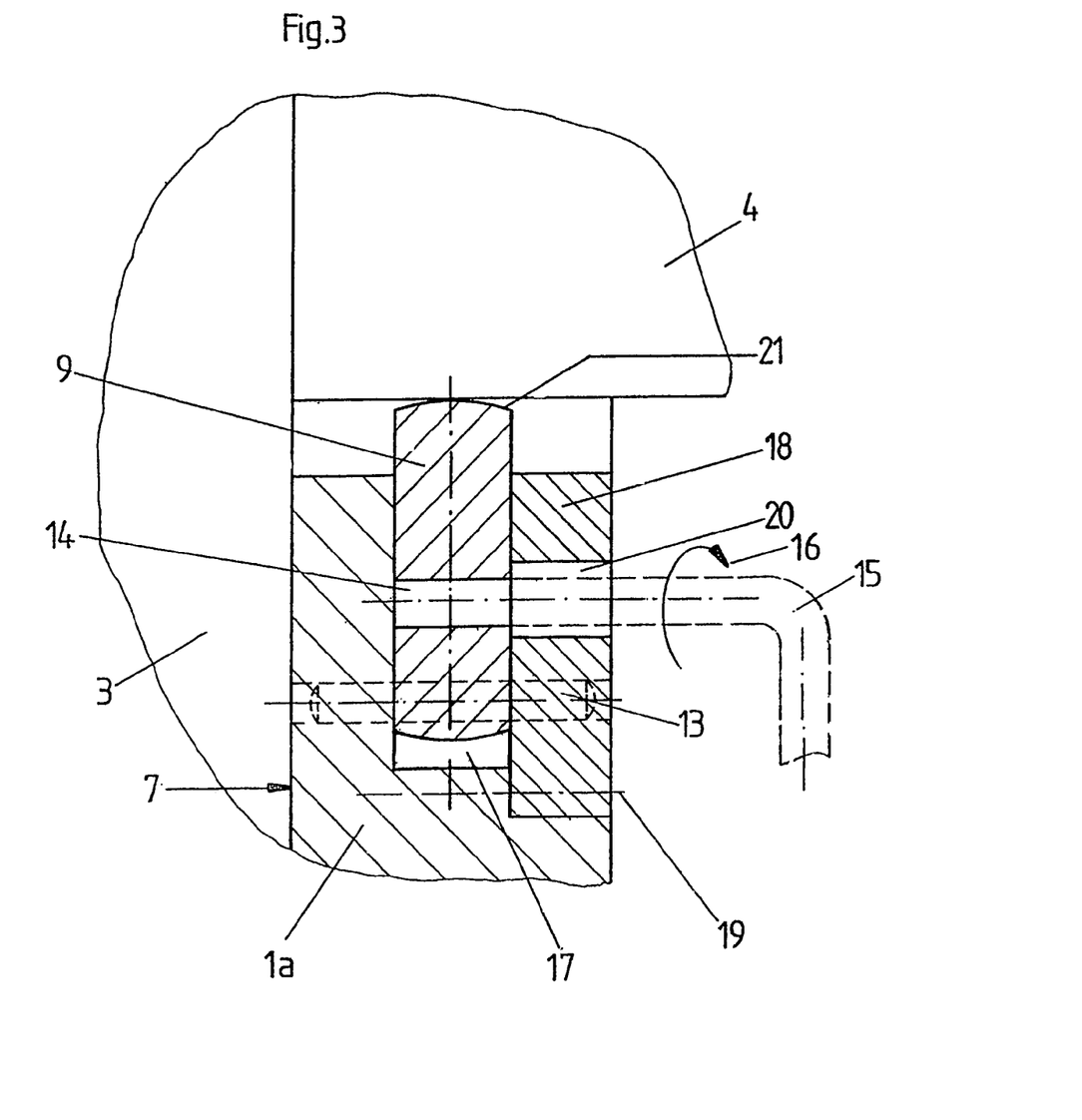
FIG. 3 is an enlarged depiction of the section along A-A in FIG. 2.

The cam disk 9 is a simple flat component that can easily be accommodated in a small pocket-shaped recess 17 in the base body 1a. The pocket-shaped recess can then be closed with a cover 18, as shown in FIG. 3. The cover 18 is fastened to the base body 1a by means of fastening screws 19, of which only one is indicated by means of a center line thereof. The cover 18 furthermore has an access opening 20 through which the engagement opening 14 in the cam disk 9 can be accessed. FIG. 3 also contains the depiction of a torsional tool 15 in the form of a socket wrench (Allen tool), whereby the turning direction is indicated by the arrow 16. There is the option for fixing a certain rotary position of the cam disk 9, in that the dimensions are selected such that when the fastening screws 19 for the cover 18 are tightened, a clamping effect is exerted on the cam disk 9. For facilitating the axial displacement and the pivoting in the centering contact, the cam disk 9 has an arched surface line 21; thus a spherical contour results that is centered.

Figure 4:
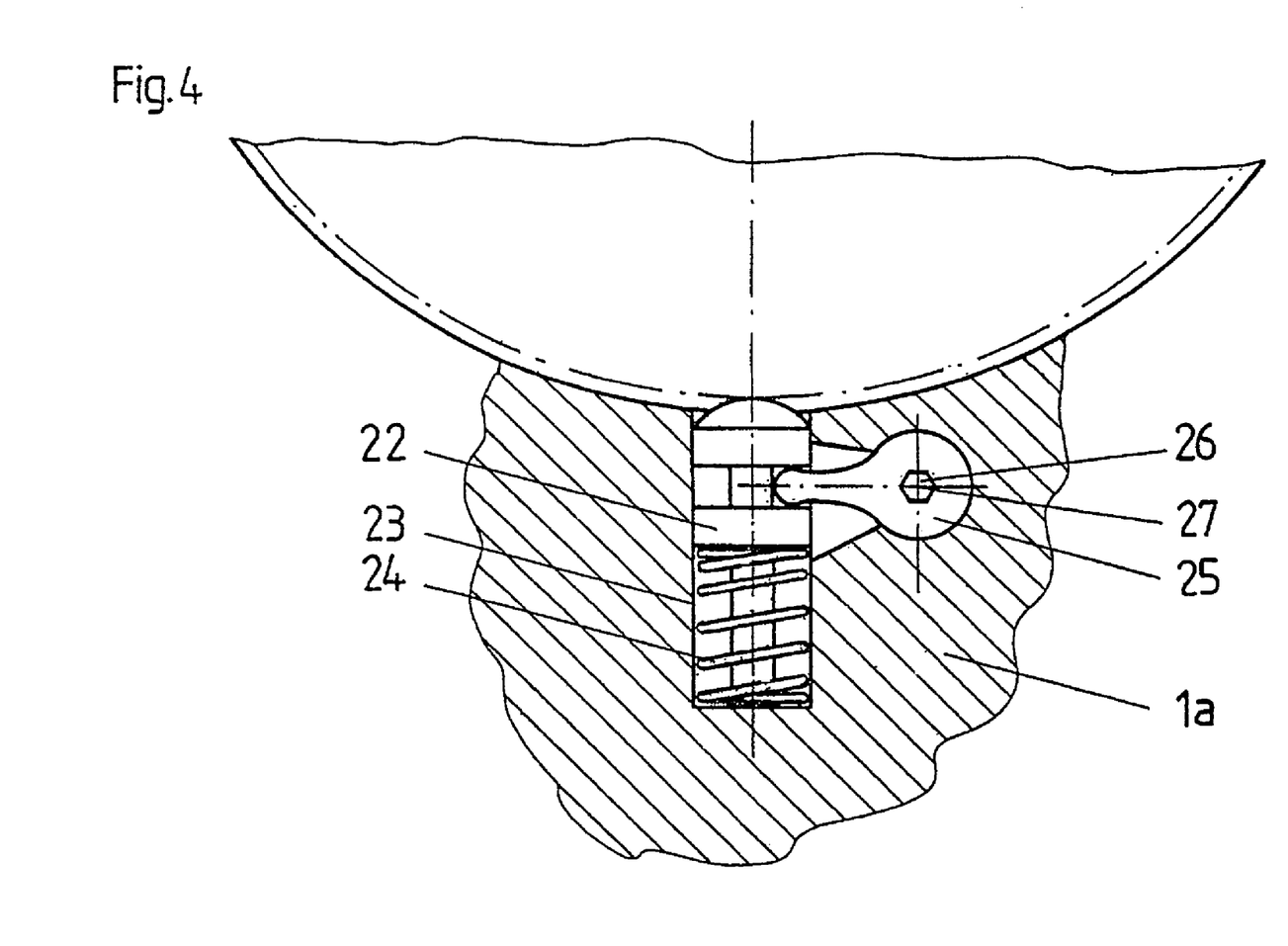
FIG. 4 depicts a modified embodiment of the movably carried adjusting member.

FIG. 4 depicts a deviation in the movably carried adjusting member. According to the depiction therein, the adjusting member is a pin 22 that is displaceably carried in a radially running bore 23 of the rotary part 1. A compression spring 24, indicated here as a helical spring, provides the pin 22 prestress in the inward direction onto the centering section 4. The pin 22 has a offset axial section in which the finger of a pivoting lever 25 engages. The pivoting lever 25 is pivotably carried with a cylindrical contour in a recess of the base body 1a and, like the cam disk 9 described in the foregoing, has an engagement opening 26 for the torsional tool. As can be seen, by pivoting about its pivot axis 27 the pivoting lever 25 can retract the pin 22 into the base body 1a from of its inwardly advanced position against the force of the compression spring 24. Thus when the pin 22 is in its retracted position, an axial movement of the base body 1a relative to the centering section 4 is easily possible, while when the compression spring 24 is released both parts are securely and precisely fixed relative to one another.

Figure 5:
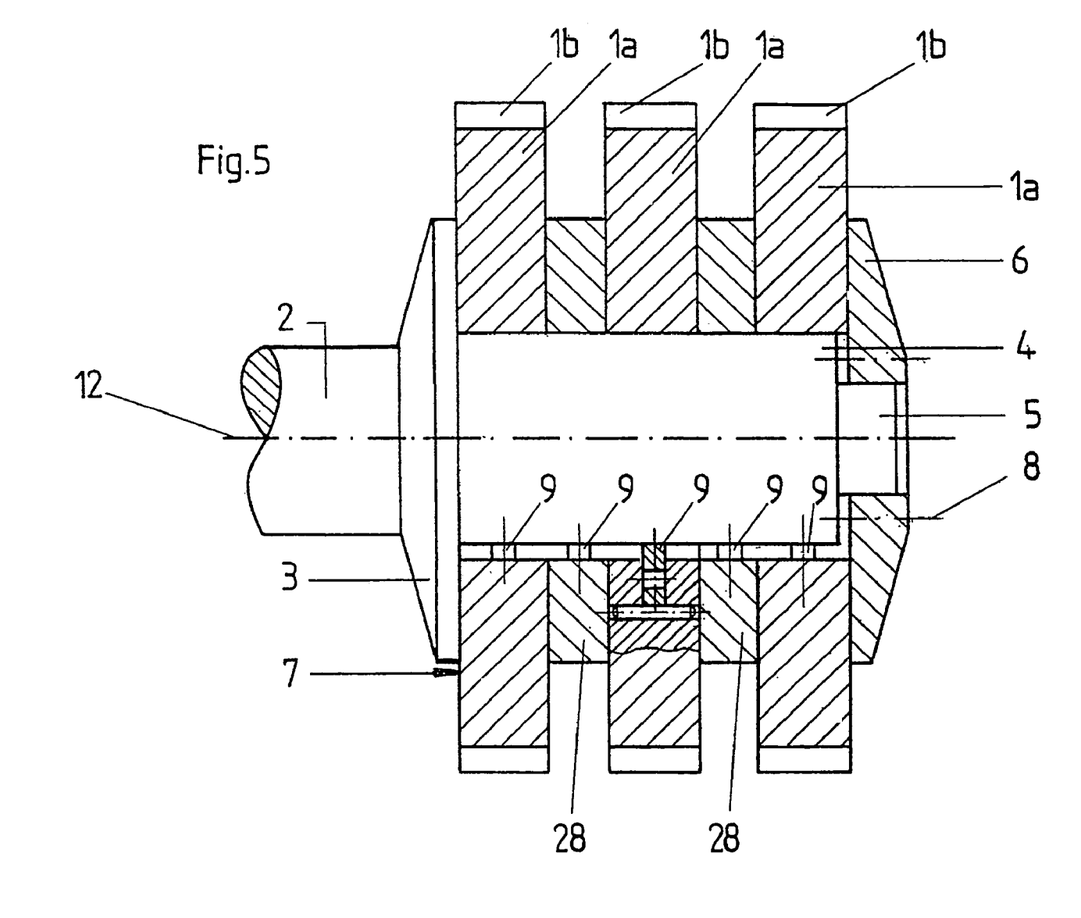
FIG. 5 is a longitudinal segment through a multi-part grinding body in which the inventive clamping device is used multiple times.

FIG. 5 makes it clear that the clamping device according to embodiment of the invention is not just suitable for individual grinding wheels or their base bodies 1a. FIG. 5 illustrates a multiple grinding wheel in which the individual base bodies 1a are axially spaced apart from one another by intermediate rings 28. It is not just every individual grinding wheel that is equipped with fixed projections and a cam disk 9. Rather, as depicted, a cam disk 9 is also provided for the intermediate rings 28 that create the spacing between the individual grinding wheels. In principle, the axial clamping between a positioning flange 3 and a mounting flange 6 is the same as in the embodiment described in the foregoing. However, it can be seen that in FIG. 5, the individual base bodies 1a and the intermediate rings 28 must be displaced over an extended axial length on the centering section 4. The inventive clamping device with the option of temporarily retracting one of the three support bodies is particularly suitable for this. In this case as well, it is not necessary to attend to a particular angular position when placing the rotary parts, which is particularly advantageous due to the great number of individual parts to be placed thereupon. The other reference numbers shown in FIG. 5 identify parts that are the same as those described in the foregoing.

Figure 6:
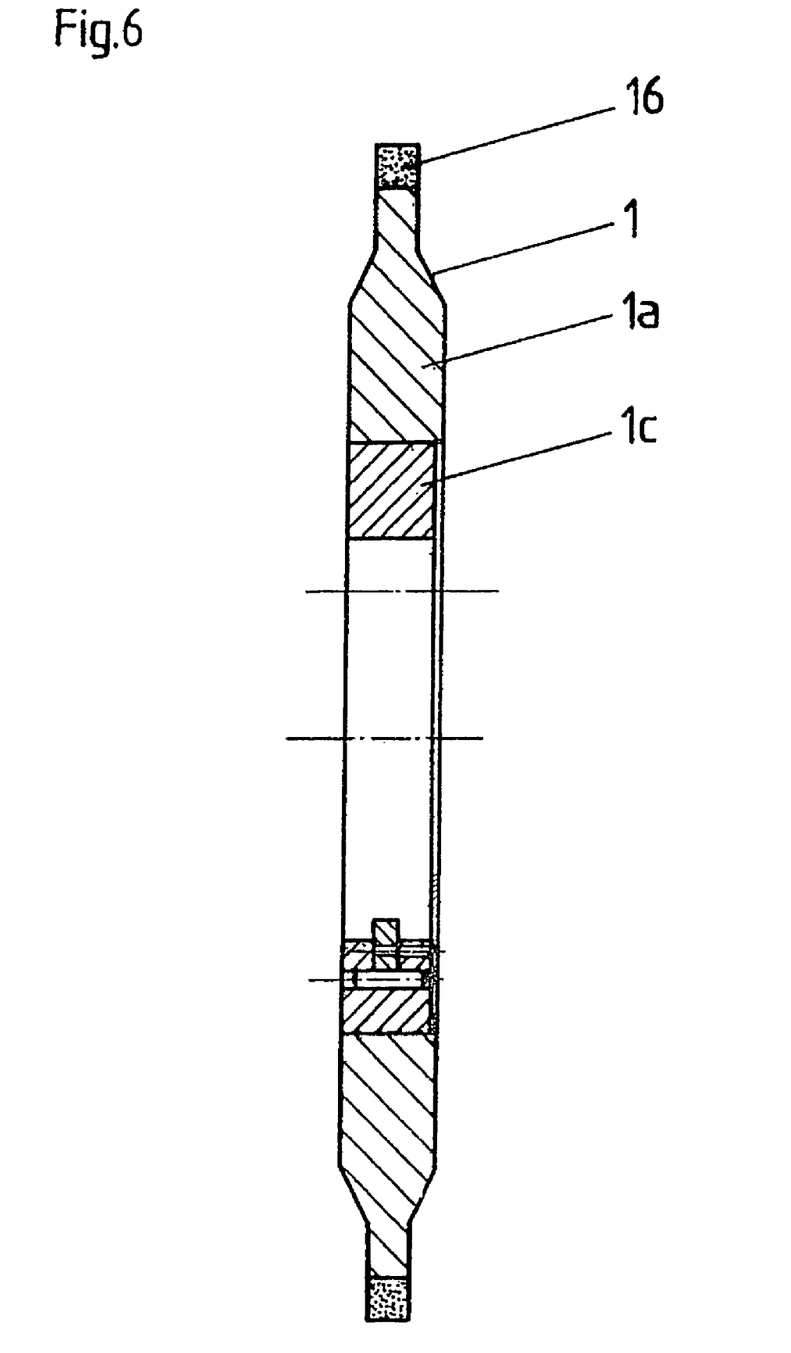
FIG. 6 illustrates a grinding wheel embodied in a composite structure and having a metal interior ring as a part of a base body thereof.

And finally, FIG. 6 depicts a grinding wheel with a composite structure. The grinding wheel represents the rotary part 1, and has a base body 1a, an abrasive layer 1b, and an interior ring 1c on which, or in which, the actual centering device is arranged or embodied. This interior ring 1c is made of metal, while the base body 1a carrying the abrasive layer 1b is made of plastic. However, it is also possible for the base body to also be made of a metal, which can also be different from the material of the interior ring.

LIST OF REFERENCE NUMBERS

1 Rotary part
1a Base body
1b Abrasive layer
1c Interior ring
2 Grinding spindle rotor
3 Positioning flange
4 Centering section
5 Centering collar
6 Mounting flange
7 Planar side
8 Tensioning bolt
9 Cam disk
10 Interior recess
11 Fixed projections
12 Axis of rotation
13 Bearing pin
14 Engagement opening
15 Torsional tool
16 Arrow indicating direction of rotation
17 Recess
18 Lid
19 Fastening screw
20 Access opening
21 Surface line
22 Pin
23 Bore
24 Compression spring
25 Pivoting lever
26 Engagement opening
27 Pivoting axis
28 Intermediate ring

The invention claimed is:

1. A clamping device configured to effect axially aligned clamping onto a grinding spindle rotor, wherein the grinding spindle rotor defines a grinding axis, the clamping device comprising:

a centering section extending from said grinding spindle rotor and coaxially aligned with said grinding axis;

a rotary part including an interior recess having a peripheral recess wall;

alignment contact portions arranged to coaxially align the rotary part on the centering section, the alignment contact portions consisting of three support bodies that are disposed projecting into said interior recess from said peripheral recess wall and disposed angularly displaced from one another along a circumferential direction of said interior recess;

the interior recess and said three support bodies being configured to accept the centering section between the three support bodies so as to coaxially align the rotary part with the grinding axis by positioning the rotary part on the centering section via said three support bodies;

the three support bodies consisting of two fixed projections fixed relative said rotary part that project into the interior recess of the rotary part, and a third support body which is an adjusting member that is movably carried in said rotary part for movement thereof between a radially outward position and a radially inward centering position adjusting the rotary part to be coaxially aligned with said grinding axis, said centering position being adjacent to said centering section;

said two fixed projections presenting a contour engaging the centering section, the contour being convex arch with an axial extending apex configured to engage the centering section along an area limited to substantially a linear contact area; and a detachable device for axially clamping the rotary part on the grinding spindle rotor.

2. A clamping device according to claim 1, wherein said centering section is cylindrical and said linear contact area extends parallel said grinding axis on said centering section.

3. A clamping device according to claim 1 or 2, wherein said adjusting member comprises a cam disk carried in said rotary part having an axis of rotation parallel to said grinding axis, said cam disk including an engagement opening for inserting a torsional tool into an end face thereof.

4. A clamping device according to claim 3, further comprising a cover that has an access opening for said torsional tool and covers said cam disk.

5. A clamping device according to claim 4, wherein said cover simultaneously acts as fixing member, fixing the situation or position of said cam disk.

6. A rotary part according to claim 3, further comprising two support members carried on the rotary part, said support members rotatably supporting said cam disk by engaging a circumference of the cam disk, and the cam disk being configured to variably protrude toward a center of the interior recess with rotation of the cam disk while supported by the two support members.

7. A clamping device according to claim 6, wherein said two support members are two bearing pins that are disposed in said rotary part parallel to said grinding axis, said cam disk being supported on said two bearing pins.

8. A clamping device according to claim 1 or 2, wherein said adjusting member is self-locking with respect to fixation thereof after being positioned against said centering section.

9. A clamping device according to claim 1, wherein said adjusting member is a pin and the clamping device further comprises a compression spring biasing said pin, and a radially running bore in said rotary part displaceably carrying said pin, said pin being disposed adjacent to said centering section.

10. A clamping device according to claim 9, wherein:
said compression spring is pre-stressed inwardly into said interior recess; and
said pin is engaged by a pivoting lever that is carried in said rotary part, said pivoting lever having a pivot axis which runs parallel to an axis of rotation of said rotary part, said pivoting lever including an engagement opening for inserting a torsional tool into an end face thereof.

11. A clamping device according to 10, further comprising a cover covering said pivoting lever and having an access opening for said torsional tool.

12. A clamping device according to claim 11, wherein said cover simultaneously acts as fixing member, fixing the situation or position of said pivoting lever.

13. A clamping device according to claim 1 or 2, wherein said rotary part includes a grinding wheel having a base body including a circumferentially applied abrasive layer.

14. A clamping device according to claim 1 or 2, further comprising a plurality of said rotary parts, each serving as a grinding wheel, said rotary parts being axially spaced apart from one another by intermediate rings so as to form a multiple grinding wheel.

15. A clamping device according to claim 1 or 2, wherein said two fixed projections of said rotary part are integral with the rotary part.

16. A clamping device according to claim 1 or 2, wherein said adjusting member has a spherical contour in a direction of said axis of rotation of said rotary part.

17. A clamping device, comprising:
a rotary part including an interior recess and three support bodies that are disposed at an angular interval from one another in said interior recess, said rotary part being receivable on a grinding spindle rotor which includes a centering section that continuously centeringly receives said rotary part while passing through the interior recess thereof with mutually centering contact between the interior recess of the rotary part and the centering section of the grinding spindle rotor via said three support bodies, two of the three support bodies comprising fixed projections of said rotary part that project into the interior recess of the rotary part, and a third support body of the three support bodies including an adjusting member that is movably carried in said rotary part for movement thereof between a radially outward position and a radially inward centering position, said centering position being adjacent to said centering section, wherein said adjusting member comprises a cam disk carried in said rotary part having an axis of rotation parallel to said axis or rotation of said rotary part, said cam disk including an engagement opening for inserting a torsional tool into an end face thereof;
two bearing pins that are disposed in said rotary part parallel to said axis of rotation thereof, an exterior contour of said cam disk being supported on said two bearing pins; and
a detachable device for securably axially clamping the rotary part on the grinding spindle rotor.

18. A clamping device, comprising:
a rotary part including an interior recess and three support bodies that are disposed at an angular interval from one another in said interior recess, said rotary part being receivable on a grinding spindle rotor which includes a centering section that continuously centeringly receives said rotary part while passing through the interior recess thereof with mutually centering contact between the interior recess of the rotary part and the centering section of the grinding spindle rotor via said three support bodies, two of the three support bodies comprising fixed projections of said rotary part that project into the interior recess of the rotary part and a third support body of the three support bodies including an adjusting member that is movably carried in said rotary part for movement thereof between a radially outward position and a radially inward centering position, said centering position being adjacent to said centering section; and
a detachable device for securably axially clamping the rotary part on the grinding spindle rotor, wherein:
said adjusting member is a pin that is pre-stressed with a compression spring and which is displaceably carried in a radially running bore of said rotary part, said pin being disposed adjacent to said centering section;
said compression spring is pre-stressed inwardly into said interior recess; and
said pin is engaged by a pivoting lever that is carried in said rotary part, said pivoting lever having a pivot axis which runs parallel to an axis of rotation of said rotary part, said pivoting lever including an engagement opening for inserting a torsional tool into an end face thereof.

19. A rotary part for a clamping device, the rotary part configured to effect axial alignment on a grinding spindle rotor defining a grinding axis and having a centering section extending from said grinding spindle rotor and coaxially aligned with said grinding axis, the clamping device comprising:
a base body including an interior recess having a peripheral recess wall;
alignment contact portions arranged to coaxially align the base body on the centering section, the alignment contact portions consisting of three support bodies extending radially inward from said peripheral recess wall and disposed angularly displaced from one another along a circumferential direction of said interior recess for centering based on three locations;
the interior recess and said three support bodies being configured to accept the centering section between the three support bodies so as to coaxially align the base body with the grinding axis by positioning the base body on the centering section via said three support bodies;

said three support bodies consisting of two fixed projections fixed relative said base body that project into the interior recess of the base body and a third support body which is an adjusting member that is movably carried in the base body and which is radially adjustable in said interior recess such that said adjusting member is movable between a radially outward position and a radially inward centering position adjusting the base body to be coaxially aligned with said grinding axis, said centering position being extended into the interior recess; and said two fixed projections presenting a contour oriented to engage the centering section, the contour being convex arch with an axial extending apex configured to engage the centering section along an area limited to substantially a linear contact area.

20. A rotary part according to claim 19, wherein said base body includes a grinding wheel which comprises an interior ring comprised of metal forming said interior recess and to which the three support bodies are attached, said base body surrounding said interior ring.

21. A rotary part according to claim 19, wherein said adjusting member is a cam disk and said rotary part further comprises two support members carried on the base body, said support members rotatably support said cam disk by engaging a circumference of the cam disk, and the cam disk is configured to variably protrude inward a center of the interior recess with rotation of the cam disk while supported by the two support members.

22. A clamping device according to claim 21, wherein said two support members are two bearing pins that are disposed in said base body parallel to said grinding axis, said cam disk being supported on said two bearing pins.

* * * * *